(12) United States Patent
Gandhi et al.

(10) Patent No.: US 10,579,589 B2
(45) Date of Patent: Mar. 3, 2020

(54) DATA FILTERING

(71) Applicant: SAP SE, Walldorf (DE)

(72) Inventors: Unmesh Gandhi, Montreal (CA); Ives Toe, Brossard (CA); Sebastien Phan, Boucherville (CA); Evelyna Holban, Laval (CA); Tim Gast, Verdun (CA)

(73) Assignee: SAP SE, Walldorf (DE)

( * ) Notice: Subject to any disclaimer, the term of this patent is extended or adjusted under 35 U.S.C. 154(b) by 555 days.

(21) Appl. No.: 14/535,051

(22) Filed: Nov. 6, 2014

(65) Prior Publication Data
US 2016/0132496 A1 May 12, 2016

(51) Int. Cl.
*G06F 16/242* (2019.01)
*G06F 16/16* (2019.01)
*G06F 16/14* (2019.01)
*G06F 16/245* (2019.01)
*G06F 16/2457* (2019.01)

(52) U.S. Cl.
CPC .......... *G06F 16/164* (2019.01); *G06F 16/148* (2019.01); *G06F 16/244* (2019.01); *G06F 16/245* (2019.01); *G06F 16/2457* (2019.01)

(58) Field of Classification Search
CPC .. G06F 17/30076; G06F 16/24; G06F 16/244; G06F 16/245; G06F 16/2457
See application file for complete search history.

(56) References Cited

U.S. PATENT DOCUMENTS

| 7,512,614 B2* | 3/2009 | Yao | G06F 17/30563 |
|---|---|---|---|
| 2003/0135495 A1* | 7/2003 | Vagnozzi | G06F 17/30324 |
| 2004/0015438 A1* | 1/2004 | Compiano | G06Q 20/102 |
| | | | 705/40 |
| 2004/0093323 A1* | 5/2004 | Bluhm | G06F 17/30011 |
| 2005/0097084 A1* | 5/2005 | Balmin | G06F 17/30457 |
| 2006/0271884 A1* | 11/2006 | Hurst | G06F 17/30716 |
| | | | 715/854 |
| 2007/0136323 A1* | 6/2007 | Zurek | G06F 17/30592 |
| 2008/0052275 A1* | 2/2008 | Kantak | G06F 17/30663 |
| 2008/0082514 A1* | 4/2008 | Khorlin | G06F 17/30908 |

(Continued)

OTHER PUBLICATIONS

B. Houser, "Hierarchical Queries with DB2 Connect By, A new method for recursively processing data relationships", 2011, IBM.*

(Continued)

*Primary Examiner* — Apu M Mofiz
*Assistant Examiner* — Sheryl L Holland
(74) *Attorney, Agent, or Firm* — Klarquist Sparkman, LLP

(57) ABSTRACT

A method for filtering a product transaction data file involves receiving, by a computer, a query including one or more groups of attribute conditions for filtering the product transaction data file. The attribute conditions in the query are applicable to product attribute data records split across a set of vertically split attribute data files. The method further includes determining which of the product attribute data records split across the set of vertically split attribute data files satisfy all of the one or more groups of attribute conditions in the query, identifying product keys associated with the product attribute data records that satisfy all of the one or more groups of attribute conditions in the query, and using the so-identified product keys to filter product data records in the transaction data file.

13 Claims, 9 Drawing Sheets

(56) References Cited

U.S. PATENT DOCUMENTS

| | | | |
|---|---|---|---|
| 2008/0162305 A1* | 7/2008 | Rousso | G06Q 10/0631 |
| | | | 705/26.5 |
| 2008/0183458 A1* | 7/2008 | Bobok | G06F 17/5022 |
| | | | 703/17 |
| 2008/0263006 A1* | 10/2008 | Wolber | G06F 17/30545 |
| 2008/0281820 A1* | 11/2008 | Do | G06F 17/303 |
| 2008/0288889 A1* | 11/2008 | Hunt | G06Q 30/02 |
| | | | 715/810 |
| 2011/0246294 A1* | 10/2011 | Robb | G06Q 30/00 |
| | | | 705/14.52 |
| 2012/0023116 A1* | 1/2012 | Wilkes | G06F 17/30427 |
| | | | 707/756 |
| 2012/0226492 A1* | 9/2012 | Tsuboi | G06F 17/30684 |
| | | | 704/9 |
| 2012/0323846 A1* | 12/2012 | Bai | G06Q 10/10 |
| | | | 707/610 |
| 2013/0060662 A1* | 3/2013 | Carlson | G06Q 30/06 |
| | | | 705/26.61 |
| 2013/0159324 A1* | 6/2013 | Xu | G06F 17/30545 |
| | | | 707/754 |
| 2015/0363414 A1* | 12/2015 | Acharyya | G06F 17/30091 |
| | | | 714/19 |
| 2016/0078398 A1* | 3/2016 | Lu | G06Q 10/087 |
| | | | 705/28 |

OTHER PUBLICATIONS

Chang et al. "Mining the World Wide Web—An Information Search Approach", 2001, Springer Science + Media, pp. 130-135.*

"The Raiser's Edge Query and Export Guide", 2008, BlackBaud, Inc. (Year: 2008).*

"Step-By-Step Guide to Creating SQL-Hierarchical Queries", Published Jan. 14, 2016, downloaded on May 7, 2018 from https://www.clarityinsights.comguide-to-sql-hierarchical-queries, 16 pages.

* cited by examiner

| Product ID | Location ID | Time | Sales | Volume |
|---|---|---|---|---|
| P00000000001 | G00001 | W2009033 | 232561.23 | 1223 |
| P00000000001 | G00001 | W2009034 | 188287.56 | 987 |
| P00000000002 | G00001 | W2009033 | 354325.78 | 3254 |
| P00000000002 | G00001 | W2009034 | 235434 | 2345 |
| P00000000003 | G00001 | W2009033 | 235326 | 2897 |
| P00000000003 | G00001 | W2009034 | 235576 | 2900 |
| P00000000001 | G00002 | W2009033 | 432637 | 2345 |
| P00000000001 | G00002 | W2009034 | 876484 | 4554 |
| P00000000002 | G00002 | W2009033 | 324535 | 4325 |
| P00000000002 | G00002 | W2009034 | 435464 | 2345 |
| P00000000003 | G00002 | W2009033 | 576576 | 4543 |
| P00000000003 | G00002 | W2009034 | 235465 | 2343 |
| P00000000001 | G00003 | W2009033 | 655654 | 3245 |
| P00000000001 | G00003 | W2009034 | 456436.56 | 654 |
| P00000000002 | G00003 | W2009033 | 576389.22 | 4543 |
| P00000000002 | G00003 | W2009034 | 638732.24 | 5543 |
| P00000000003 | G00003 | W2009033 | 213243.65 | 2443 |
| P00000000003 | G00003 | W2009034 | 566654.43 | 6443 |

FIG. 2

| Product ID | Location ID | Time | Sales | Volume |
|---|---|---|---|---|
| P00000000001 | G00001 | W2009033 | 23256123 | 1223 |
| P00000000001 | G00002 | W2009033 | 432637 | 2345 |

601

| PROD KEY | BRAND | COLOR |
|---|---|---|
| PROD1 | ADIUM | PURPLE |
| PROD2 | ADIUM | PURPLE |
| PROD3 | BROC | PINK |

602

| PROD KEY | WEIGHT |
|---|---|
| PROD1 | 150g |
| PROD2 | 140g |
| PROD3 | 100g |

603

| Product ID | Location ID | Time | Sales | Volume |
|---|---|---|---|---|
| PROD1 | G00001 | W2009033 | 232561.2 | 1223 |
| PROD2 | G00001 | W2009034 | 188287.6 | 987 |
| PROD3 | G00001 | W2009033 | 354325.8 | 3254 |
| PROD4 | G00001 | W2009034 | 235434 | 2345 |
| PROD5 | G00001 | W2009033 | 235326 | 2897 |
| PROD6 | G00001 | W2009034 | 235576 | 2900 |
| PROD7 | G00002 | W2009033 | 432637 | 2345 |
| PROD8 | G00002 | W2009034 | 876484 | 4554 |
| PROD9 | G00002 | W2009033 | 324535 | 4325 |
| PROD10 | G00002 | W2009034 | 435464 | 2345 |
| PROD11 | G00002 | W2009033 | 576576 | 4543 |
| PROD12 | G00002 | W2009034 | 235465 | 2343 |
| PROD13 | G00003 | W2009033 | 655654 | 3245 |
| PROD14 | G00003 | W2009034 | 456436.6 | 654 |
| PROD15 | G00003 | W2009033 | 576389.2 | 4543 |
| PROD16 | G00003 | W2009034 | 638732.2 | 5543 |
| PROD17 | G00003 | W2009033 | 213243.7 | 2443 |
| PROD18 | G00003 | W2009034 | 566654.4 | 6443 |

604

(BRAND EQ 'ADIUM' AND COLOR EQ 'PURPLE' AND WEIGHT EQ '150g') OR (PROD KEY EQ 'PROD3')

FIG. 6

DATA FILTERING

BACKGROUND

With the expanding reach of computer networks and proliferation of connected devices, data collection entities (e.g., market research organizations) can collect a tremendous volume and variety of data related to sales or use of products in the market place from a wider range of sources than before (e.g., from point-of-sale (POS) systems, online transactions, social media, loyalty programs, call center records, etc.). The collected data may be multi-dimensional and also include multiple attributes for each data dimension. End-users (e.g., product manufacturers, merchandisers or retailers, etc.) can, in principle, analyze this data to generate valuable insights for improving the effectiveness of marketing campaigns, optimizing assortment and merchandising decisions, and removing inefficiencies in distribution and operations. However, it may not be necessary to analyze all of the large volumes and variety of the multiple attribute and multi-dimensional data that the end-users can receive from the data collection entities to extract meaningful or relevant content for the end-users' purposes. Further, storing all of the large volumes and variety of data that the end-users can receive (e.g., automatically or on-line) from the data collection entities may be also be unnecessary and burdensome.

Consideration is being given to systems and methods for consolidating or structuring multiple attribute and multi-dimensional data for storage or for further data analytics.

SUMMARY

In a general aspect a method for filtering a product transaction data file includes receiving, by a computer, a query including one or more alternate groups of attribute conditions for filtering the product transaction data file. The attribute conditions may be applicable to product attribute data records that are split or present across a set of vertically split attribute data files.

In a further aspect, the method further includes determining which of the product attribute data records present across the set of vertically split attribute data files satisfy at least one group of attribute conditions in the query and identifying keys associated with the product attribute data records that satisfy at least one group of attribute conditions in the query, and using the identified keys to filter product data records in the transaction data file.

The details of one or more implementations are set forth in the accompanying drawings and the description below. Further features of the disclosed subject matter, its nature and various advantages will be more apparent from the accompanying drawings the following detailed description, and the claims.

BRIEF DESCRIPTION OF THE DRAWINGS

FIG. 2 is an illustration of an example transaction data file that includes data for the three Master Data dimensions (viz. product, location, and time dimensions) and data for transaction metrics or key figures

FIG. 6 is an illustration of example vertically split product dimension files and an example transaction data file.

DETAILED DESCRIPTION

Systems and methods for filtering, consolidating and structuring multiple attribute and multi-dimensional data are described herein.

In an example retailing industry scenario, internal or external market research entities (MREs) may collect and provide multiple attribute and multi-dimensional market data (e.g., "Master Data" and "Transaction Data") related to a retailer's products or sales) in multiple data files. Each data file may, for example, include data only for some of the attributes and/or only some of the dimensions of the multiple attribute and multi-dimensional market data.

For example, Master Data records related to a retailer's products may include multi-dimensional data for three data dimensions (e.g., Product, Location and Time data dimensions). Data for each of the data dimensions (Product, Location and Time data dimensions) may be in separate data files ("master data files"). Further, each data dimension may have multiple attributes. For example, the Product data dimension may have data attributes such as Product ID, Description, EAN\UPC, Volume, Unit of Measure, etc. For each data dimension of the Master Data, the MREs may provide attribute data in separate "attribute data" files. The separate attribute data files may include attribute data for non-overlapping subsets of the data dimension attributes. For example, if the Product data dimension has twenty attributes, the MREs may provide attribute data for the first five attributes in a "file 1," data for the next ten attributes in a "file 2", and attribute data for last five attributes in a "file 3." Such representation of the data for non-overlapping subsets of the data dimension attributes in different attribute data files many be referred to herein as a "vertical split" of data. A complete set of vertically split attribute data files (e.g., file 1, file 2, and file 3) may be needed to have full information for all of the attributes of a data dimension (e.g., Product data dimension). In other words, a full attribute data record for a product consists of smaller product attribute data records present in the vertically split attribute data files, and all of the smaller product attribute data records may be needed to describe or construct the full attribute data record for the product.

Figure 1:
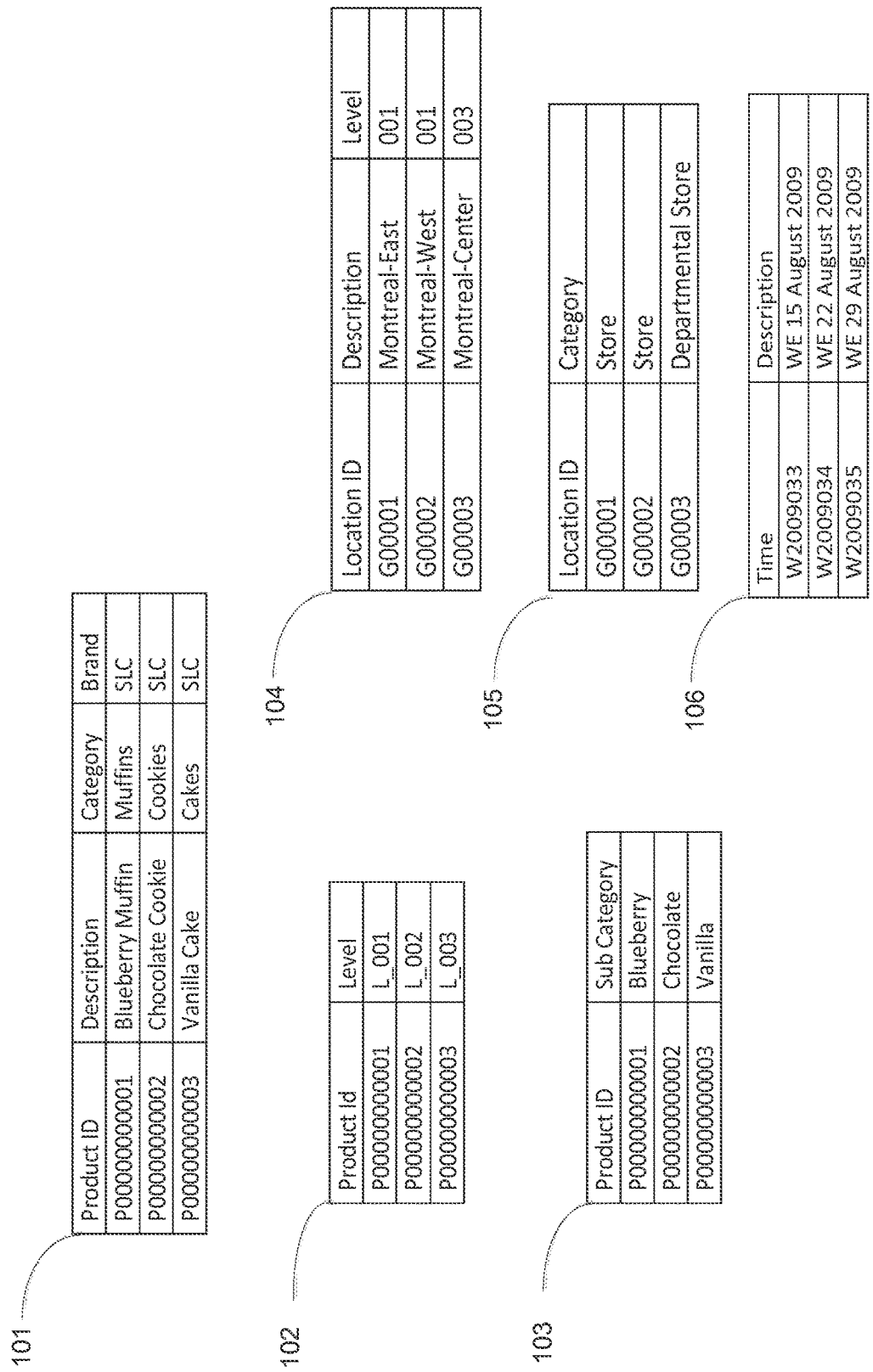
FIG. 1 is an illustration of example vertically split master data files that include attribute data for one or more attributes of a product data dimension.

FIG. 1 shows, for purposes of illustration only, example vertically split master data files (e.g., files 101, 102, and 103) that include attribute data for one or more attributes (e.g., Product ID, Description, Category, Sub-Category, Brand, Level) for the Product data dimension in the foregoing example scenario. FIG. 1 also shows, for purposes of illustration only, example vertically split master data files (e.g., files 104 and 105) that include attribute data for one or more attributes (e.g., Location ID, Description, Category and Level) for the Location data dimension and an example master data file (e.g., file 106) that includes attribute data for one or more attributes (e.g., Time and Description) of the Time data dimension in the foregoing example scenario.

In the example retailing industry scenario, a MRE may further collect and provide information related to transactions (e.g., consumer sales in retail stores or other sales channels) that involve the end-user's products in Transaction Data files. In addition to identifying one or more master data dimensions (e.g., Product, Location and Time), the Transaction Data files may include data on metrics or key figures (e.g., sales price, revenue, profit, number of items sold, etc.) that may characterize individual transactions involving the end-user's products in the market place. The metrics or key figures (e.g., sales price, number of items, etc.) may be viewed as being additional attributes of the Master Data dimensions. Thus, a transaction data file may be viewed as another type of attribute data file, which includes data for the transaction-related attributes (e.g., transaction metrics or key figures).

FIG. 2 shows, for purposes of illustration only, an example transaction data file (e.g., file 200) that include data for the three Master Data dimensions (e.g., Product ID, Location ID, and Time) and data for transaction metrics or key figures (e.g. Sales and Volume) in the foregoing example scenario.

The data included in transaction data file 200 may, for example, be physically entered (e.g., by merchants, store keepers or other personnel) or otherwise collected at points of sale of the end-user's products. While example transaction data file 200 is shown in FIG. 2 only for purposes of illustration as including only a few transaction data records (e.g., for three Product IDs P00000000001, P00000000002 and P00000000003, three location IDs G00001, G00002 and G00003), it will be understood that in many retailing scenarios Transaction Data (e.g., file 200) may include thousands if not millions of transaction data records. It may be burdensome or even impractical for an end-user (e.g., a products manufacturer, a retail chain, etc.) of the data to store or process the large data files on the end-user's computer systems (e.g., computer systems for data analytics).

In accordance with the principles of the disclosure herein, Transaction Data (e.g., as received by the end-user from the MREs) may be filtered, for example, to a manageable or relevant size for data analytics on the end-user's computer system (e.g., business intelligence systems) by retaining only the transaction data relationships (with Master Data dimensions or attributes) that may be meaningful for the end-user's data analytics. This filtering of the Transaction Data may involve filtering the transaction data (e.g., file 200), for example, based on filter criteria (e.g., Master Data attributes) which are external to and not a direct part of the transaction data files. The Master Data as noted earlier may include more than one vertically split attribute data files. Thus, filtering of the Transaction Data may involve filtering the transaction data based on the attributes of a Master Data dimension, which attributes may be provided in one file or in different vertically split attribute files.

Figure 3:
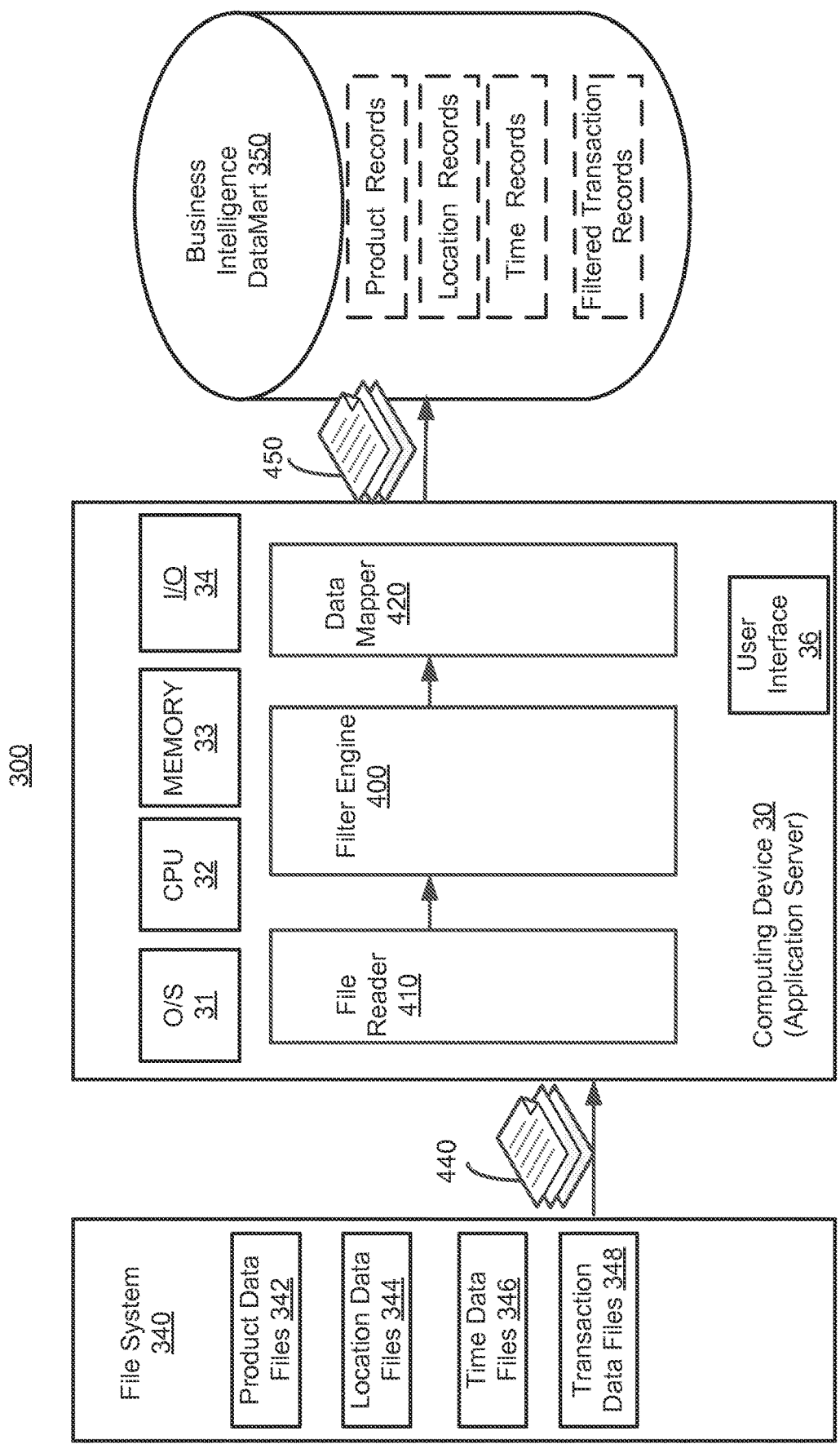
FIG. 3 is a block diagram illustration of an example system an example system 300 for filtering Transaction Data files, in accordance with the principles of the present disclosure.

FIG. 3 shows an example system 300 for filtering Transaction Data files, in accordance with the principles of the present disclosure.

System 300 may include a computing device 30 (e.g., an application server) coupled to a file system 340 or other source of product Master Data and Transaction Data (e.g., product data files 342, location data files 344, time data files 346 and transaction data files 348). Computing device 30 may include a filter engine 400, a file reader 410, and data mapper 420. File reader 410 may be configured to retrieve or read data files (e.g., product data files 342, location data files 344, time data files 346 and transaction data files 348) from file system 340 for processing by filter engine 400. Filter engine 400 may be configured to filter a data file (e.g., transaction data file 440) according to filter conditions or criteria (which may be user-defined filter conditions or criteria entered on computing device 30, for example, as a transaction data query via a user interface (UI) 36). The filtered data file output (450) of filter engine 400 may be output to a receiving database or computer system (e.g., business intelligence datamart 350) or otherwise made available (e.g., on UI 36) to the user. Computing device 30 may further include a data mapper 420 configured to prepare or format the filtered data file output 450 of filter engine 400 to be compatible, for example, with the data structure of the receiving database or computer system (e.g., business intelligence datamart 350).

In system 300, filter engine 400 and other system components (e.g., file system 410, business intelligence datamart 350, etc.) may be hosted on one or more standalone or networked physical or virtual computing machines. FIG. 3 shows, for example, filter engine 400 hosted on computing device 30 (e.g., a desktop computer, a mainframe computer, an application server, a personal computer, a mobile computing device, a laptop, a tablet, or a smart phone), which may be available to a user. Computing device 30, which includes an O/S 31, a CPU 32, a memory 33, and I/O 34, may further include or be coupled to user interface 36.

Although computing device 30 is illustrated in the example of FIG. 3 as a single computer, it may be understood that computing device 30 may represent two or more computers in communication with one another. Therefore, it will also be appreciated that any two or more components of system 300 may similarly be executed using some or all of the two or more computing devices in communication with one another. Conversely, it also may be appreciated that various components illustrated as being external to computing device may actually be implemented therewith.

Figure 4:
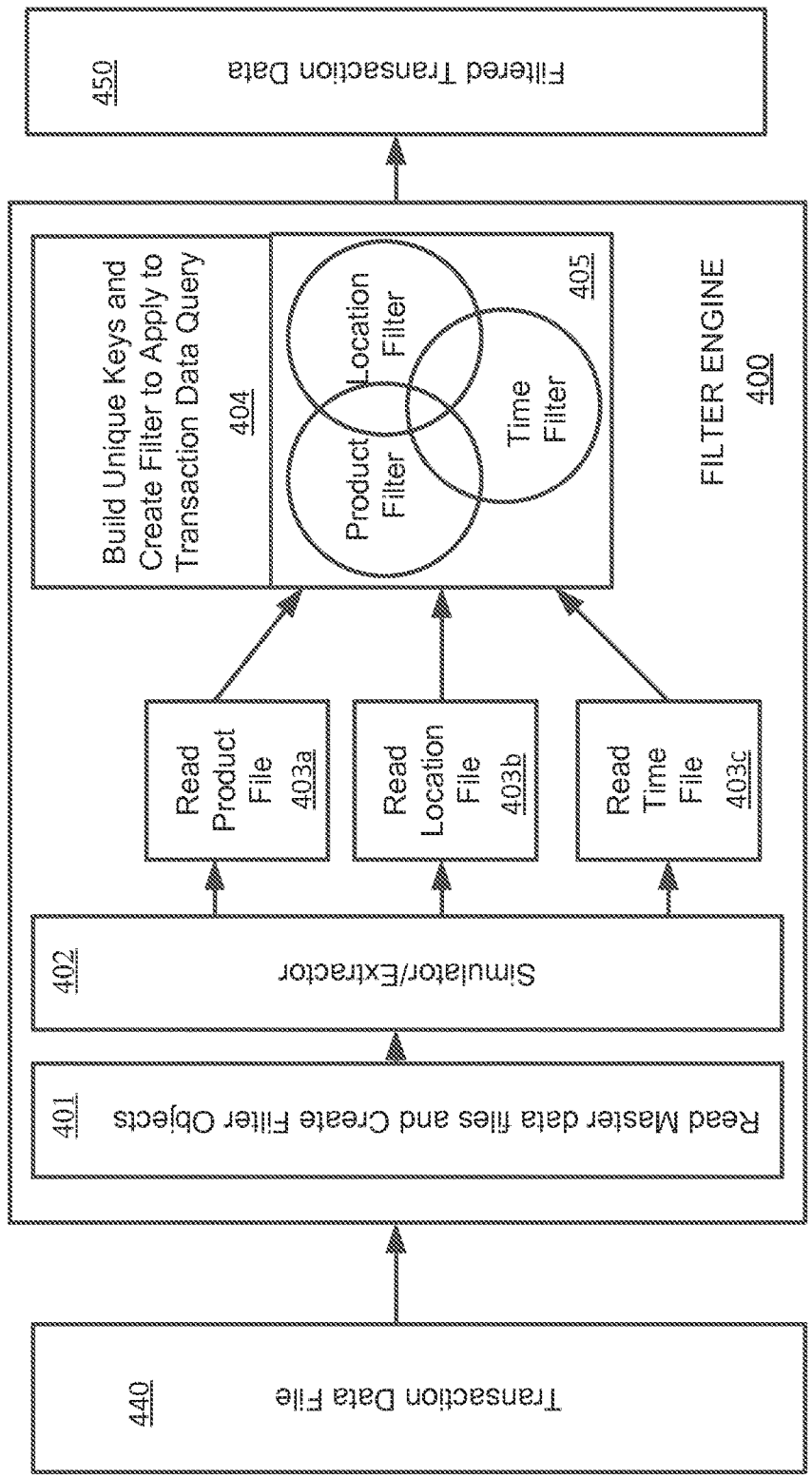
FIG. 4 is a block diagram illustration of an example schema of the processes of system of FIG. 3 for filtering Transaction Data using filter criteria involving Master Data dimensions and attributes, in accordance with the principles of the disclosure herein.

FIG. 4 shows an example schema of the processes of system 300/filtering engine 400 for filtering Transaction Data (e.g., transaction data file 440) using filter criteria involving Master Data dimensions and attributes, in accordance with the principles of the disclosure herein.

Filtering engine 400 may, for example, include several process modules (e.g., process modules 401, 402, 403a-403c, and 404) to process transaction data files (e.g., transaction data file 440) and the Master Data. Module 401 may include processes to determine if there are any active defined filter conditions (e.g., based on Product, Location and/or Time dimensions in the master data files) and accordingly create filter objects based on the defined filter conditions. Filtering engine 400 may create a query to be applied to the transaction data file 440 to generate filtered transaction data 450 using the filter objects. For this purpose, filtering engine 400 may further include a simulator/extractor module 402 that includes processes to determine, for example, based on metadata associated with the Master Data files, whether the Master Data files include vertically split files. Simulator/extractor module 402 may be configured to read, in a simulate mode, all the market data files (including vertically split files) related to the filter objects (e.g., Product, Location and/or Time dimensions). System 300/filtering engine 400 may include modules 403a, 403b, and 403c that may include processes to read, for example, product, location and time dimension files, respectively. Filtering engine 400 may apply the relevant filter objects or conditions to each dimension file (including vertically split attribute files) to identify the data record keys in each dimension file which pass or satisfy the filter conditions. Module 404 may include processes to collect a list of the so-identified "passing" keys which pass or satisfy the filter conditions. Module 404 may use the passing keys to create a filter (e.g., filter 405) to apply the transaction data query to the transaction data file 440 to generate filtered transaction data file 450.

It is noted that filter engine 400 may provide an end-user with the ability to filter the data present in transaction data file 440 based on attributes, which are not directly part of the transaction data file, but which may be part of other files (e.g., master data files that may be vertically split by data dimension and/or attributes). Filter engine 400 may establish a link between the other files, form a complex filter condition (which is shown in FIG. 4, schematically, for example, as filter 450) and apply the complex filter condition to the data present in transaction data file 440.

Figure 5:
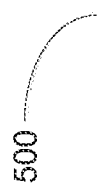
FIG. 5 is an illustration of example filtered transaction data file, which may be obtained by using a filter engine configured to filter transaction data files, in accordance with the principles of the disclosure herein.

As an example of the use of system 300/filter engine 400 to filter transaction data files (with reference to master data files 101-106, FIG. 1), example transaction data queries or filter conditions may be based on Product, Location and Time dimension attributes. An example user-defined filter condition or query (e.g. based on the Product, Location and Time data dimensions and attributes in files 101-106) may be: Filter transaction data for which Product Brand=SLC, Product Level=L_001, Product Subcategory=Blueberry, Location Level=001, Location Category=Store, and Time=W200933. As noted earlier system 300/filter engine 400 may, for example, allow an end-user to define transaction data queries or filter conditions (via user interface 36) to configure filter engine 400 to filter transaction data. FIG. 5 shows an example filtered transaction data file 500, which may be obtained by using filter engine 400 configured to filter transaction data file 200 (FIG. 2) according to the foregoing user-defined filter condition or query based on the Product, Location and Time dimension attributes.

As another example of the use of system 300/filter engine 400 to filter transaction data files, FIG. 6 shows, for purposes of illustration, two example vertically split product dimension files (e.g., file 601 and file 602) and an example transaction data file 602. File 601 may, for example, contain data records for product dimension attributes (Product key, Brand and Color) and file 602 may contain data records for product dimension attributes (Product key and Weight). It will be understood that files 601-603 are referred to herein only as an example to illustrate an ability of filter engine 400 to construct a complex filter condition, which is defined using product attributes (e.g., Brand, Color, and Weight) distributed across vertically split master data files (e.g., file 601 and file 602) to filter transaction data (e.g., file 603).

As previously noted filter engine 400 provides an end-user the ability to filter the transaction data file (e.g., file 603) based on product attributes, which are not directly part of the transaction data file (e.g., file 603). In an example implementation, filter engine 400 may process the attribute data records available in the vertically split master data files (e.g., file 601 and file 602) to identify product keys of the attribute data records which pass or satisfy the user-defined filter criteria, and then use the identified product keys from file 601 and file 602 to filter transaction data file 603.

An example user-defined query or filter condition 604, which may be based on product attributes in files 601 and 602, may be may be written using mathematical operators (e.g., "OR," "AND," and "EQ," etc.) as:

(BRAND EQ 'ADIUM' AND COLOR EQ 'PURPLE' AND WEIGHT EQ '150 g') OR (PROD KEY EQ 'PROD3').

The foregoing user-defined query or filter condition 604 may be viewed as consisting of two groups of attribute conditions i.e. Group 1=(BRAND EQ 'ADIUM' AND COLOR EQ 'PURPLE' AND WEIGHT EQ '150 g') and Group 2=(PROD KEY EQ 'PROD3'). For purposes of illustration, query or filter condition 604 may be parsed as shown, for example, in TABLE I.

TABLE I

| Group No | Sequence No | Field (Attribute) | OP | Value |
| --- | --- | --- | --- | --- |
| 1 | 1 | BRAND | EQ | ADIUM |
| 1 | 2 | COLOR | EQ | PURPLE |
| 1 | 3 | WEIGHT | EQ | 150 g |
| 2 | 1 | PROD KEY | EQ | PROD3 |

In TABLE 1, Group 1 and Group 2 may refer to the alternate attribute conditions (BRAND EQ 'ADIUM' AND COLOR EQ 'PURPLE' AND WEIGHT EQ '150 g') and (PROD KEY EQ 'PROD3') that respectively precede and succeed the "OR" operator in the foregoing example user-defined filter condition 604. Further, sequence Nos. 1, 2, and 3 may refer to a sequence of attribute conditions BRAND EQ 'ADIUM', COLOR EQ 'PURPLE,' and WEIGHT EQ '150 g', within Group 1.

To apply the foregoing example user-defined filter condition 604, filter engine 400 may be configured to count the number of distinct attribute conditions ("group counts") in each of Group 1 and Group 2, with the following results: group count for Group 1=3 (corresponding to the three attribute conditions BRAND EQ 'ADIUM', COLOR EQ 'PURPLE,' and WEIGHT EQ '150 g' in Group 1) and group count for Group 2=1 (corresponding to the one attribute condition PROD KEY EQ 'PROD3' in Group 2). The group counts may be used by filter engine 400 to determine whether all of the partial filter criteria (e.g., distinct attribute conditions in each of Group 1 and Group 2) have been applied to different files (e.g., files 601 and 602) by the end of the filtering process by keeping track of group counts applied during the filtering process.

After generating the group counts for the attribute conditions in each of Group 1 and Group 2, filter engine 400 may apply filter condition 604 to vertically split product attribute files (e.g., files 601 and 602), turn-by-turn, and determine effective group counts for each of Group 1 and Group 2 for the files according to the numbers of attribute conditions (e.g., (BRAND EQ 'ADIUM', COLOR EQ 'PURPLE,' WEIGHT EQ '150 g') or (PROD KEY EQ 'PROD3')) in the group that may possibly match attribute data records in the files. For example, since file 601 contains only data records for two attributes (e.g., Brand and Color) but not the Weight attribute for each product key attribute (i.e. the condition WEIGHT EQ '150 g' does not apply to file 601), the effective group counts for Group 1 (BRAND EQ 'ADIUM', and COLOR EQ 'PURPLE') and Group 2 (PROD KEY EQ 'PROD3') may be determined as being equal to 2 and 1 (for file 601), respectively. Similarly, since file 602 contains only data records including data for only the Weight attribute and PROD KEY attribute, filter engine 400 may determine the effective group counts for Group 1 (WEIGHT EQ '150 g') and Group 2 (PROD KEY EQ 'PROD3') as being equal to 1 and 1 (for file 602), respectively.

Next, filter engine 400 may be configured to process file 601 to determine which product key (PROD KEY) data records in file 601 can pass the attribute conditions of filter condition 604. Filter engine 400 may, for example, determine after reading file 601, that of the data records for the three PROD KEY values (e.g., PROD1, PROD2, AND PROD3) listed in file 601 only the data records for PROD1 and PROD2 may pass the two effective Group 1 conditions (i.e. BRAND EQ 'ADIUM' and COLOR EQ 'PURPLE,') and only the data records for one PROD KEY value (i.e. PROD3) may pass the one effective Group 2 condition (i.e. PROD KEY EQ 'PROD3'). This determination of which product keys pass the attribute conditions of filter condition 604 may be summarized as shown, for example, in TABLE 2 below.

TABLE 2

(File 601 Keys passing attribute conditions)

| Key | Group No | Effective Group Count | Is_intial_group_count_reached? |
|---|---|---|---|
| PROD1 | 1 | 2 | FALSE (<3) |
| PROD2 | 1 | 2 | FALSE (<3) |
| PROD3 | 2 | 1 | TRUE (=1) |

Filter engine 400 may then process the next vertically split product attributes file (e.g., file 602) in a similar manner to determine which product keys (PROD KEY data records) in file 602 can pass the attribute conditions of filter condition 604. Filter engine 400 may, for example, determine after reading file 602, that data records in file 602 for one PROD KEY value (i.e., PROD1) can pass the one effective Group 1 condition (WEIGHT EQ '150 g'), and one PROD KEY value (i.e. PROD3) can pass the one effective Group 2 condition (PROD KEY EQ 'PROD3') of filter condition 604. This determination of which keys pass the attribute conditions of filter condition 604 may be summarized as shown, for example, in TABLE 3 below.

TABLE 3

(File 602 Keys passing attribute conditions)

| Key | Group No | Effective Group Count | Is_initial_group_count_reached? |
|---|---|---|---|
| PROD1 | 1 | 1 | FALSE (<3) |
| PROD3 | 2 | 1 | TRUE (=1) |

The determinations (e.g., TABLES 2 and 3) by filter engine 400 of which product keys in files 601 and 602 pass filter condition 604 may be combined (since the attribute conditions of filter 604 in each of Group 1 or Group 2 are cumulative) as shown, for example, in TABLE 4 below.

TABLE 4

(File 601 and File 602 keys passing filter condition)

| Key | Group no | Group Count | Is_intial_group_count_reached? |
|---|---|---|---|
| PROD1 | 1 | 3 | TRUE |
| PROD3 | 2 | 2 | TRUE |

Figure 7:
FIG. 7 is an illustration of an example output of a filter engine using product keys to filter a transaction data file, in accordance with the principles of the invention herein.

Filter engine 400 may then select product keys PROD1 and PROD 3 for which the data records in both files 601 and 602 pass or satisfy the attribute conditions (in Group 1 and Group 2 of filter condition 604) to filter transaction data file 603. The "passing" data records may be distributed across vertically split files 601 and 602. Filter engine 400 may include algorithms to confirm that the selected product keys have reached the initial group counts, as shown in TABLE 4. Such confirmation may ensure that the selected product keys correspond to attribute data records that pass or satisfy all of the attribute conditions contained in filter condition 604 even though the attribute data records are split or distributed across vertically split files 601 and 602. FIG. 7 illustrates an example output 700 of filter engine 400 using product keys PROD1 and PROD3 to filter transaction data file 603.

Figure 8:
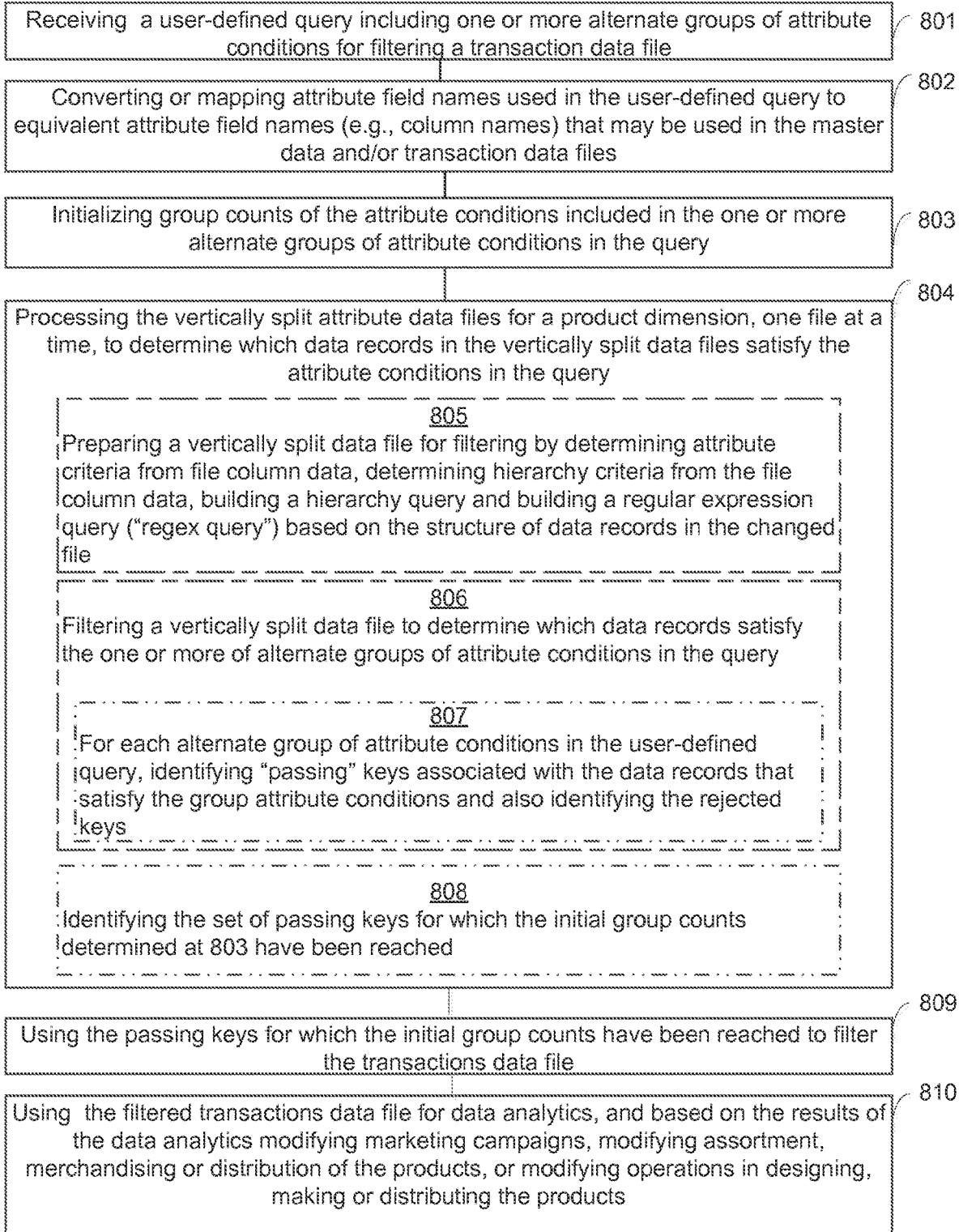
FIG. 8 is an illustration of an example method for filtering a transaction data file based on multi attribute and multi-dimensional master product data, which may be available in vertically split data files, in accordance with the principles of the present disclosure.
Figure 9:
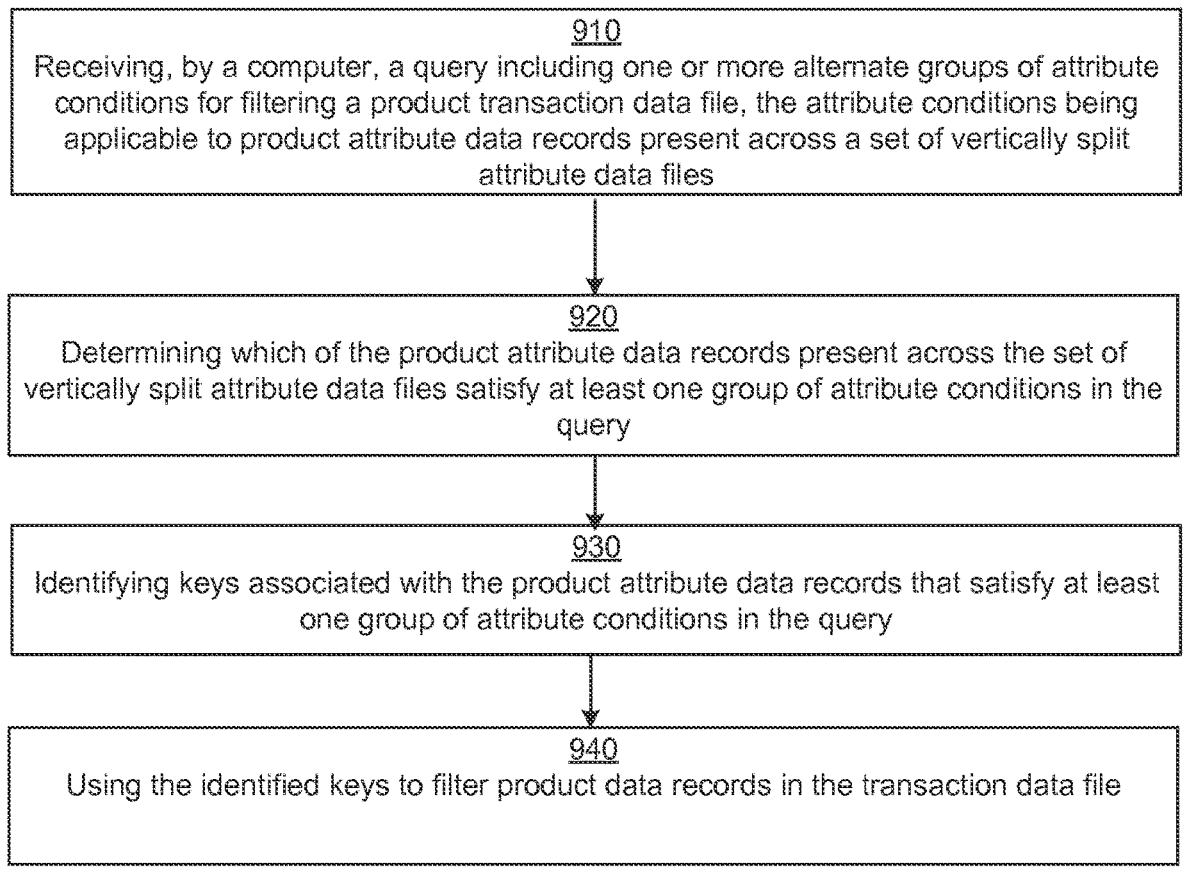
FIG. 9 is an illustration of another example method for filtering a transaction data file based on multi attribute and multi-dimensional master product data, which may be available in vertically split data files, in accordance with the principles of the present disclosure.

FIGS. 8 and 9 show example methods 800 and 900, respectively, for filtering a transaction data file (e.g., in a retailing industry scenario) based on multi attribute and multi-dimensional master product data, which may be available in vertically split data files, in accordance with the principles of the present disclosure.

The multi attribute and multi-dimensional product data (which may be related to product characteristics) may, for example, be stored in one or more file systems or databases. The multi attribute and multi-dimensional product data may include separate master data files for each product data dimension (e.g., for Product, Location, and Time data dimensions, etc.). Further, a master data file for any dimension (e.g., Product dimension) may include vertically split attribute data files for that dimension. Individual data records in the transaction data file and in the various vertically split attribute data files may, for example, be indexed, identified or associated with keys or identifiers (e.g., Product Keys). A full attribute data record (i.e. a data record with fields for a full set of attributes of a data dimension) may be split and present across the various vertically split attribute data files as smaller length data records with data for non-overlapping sub-sets of the full set of attributes of a data dimension.

Methods 800 and 900 may be used to apply a query or filter to extract a smaller number of data records from the transaction data file, based on attribute data that is included in the various vertically split attribute data files. The query or filter (e.g., filter condition 604, FIG. 6), which may be a user-defined query, may include one or more of alternate groups of attribute conditions (i.e. conditions or requirements on the attribute field values in the data records of the vertically split attribute data files). The attribute conditions may be expressed using mathematics or logic terminology (e.g., "=", ">", "<", True, False, etc.), Methods 800 and 900 may involve using a filter engine hosted on one or more computers to process the vertically split attribute data files. The filter engine may identify the keys associated with attribute data records in the vertically split attribute data files that can satisfy one or more of alternate groups of attribute conditions in the query or filter. The filter engine may then use the so-identified keys to filter the transaction data file.

In an example implementation, method 800 may involve receiving a user-defined query or filter condition including one or more groups of attribute conditions for filtering a transaction data file (801). Method 800 may further involve converting or mapping attribute fieldnames used in the user-defined query or filter condition to equivalent or standardized attribute fieldnames (e.g., column names) that may be used in the master data and/or transaction data files (802). For example, fieldname "Prod Key," which may be used in user-defined filter condition 604, may be mapped to equivalent or standardized fieldnames "Key", "Product Key" or "Product ID" that may be used in the data files. Method 800 may also include determining initial group counts of the numbers of attribute conditions included in the one or more alternate groups of attribute conditions in the user-defined query or filter condition (803) prior to processing the vertically split attribute data files.

Method 800 may involve processing the vertically split attribute data files for a product dimension, one file at a time, to determine which data records in a vertically split data file satisfy the attribute conditions in the user-defined query, group-by-group (804). The vertically split data file may be a file that has a changed format or data structure compared to a previously processed vertically split data file. Processing the vertically split attribute data files 804 may include preparing the changed vertically split data file for filtering by determining attribute criteria from file column data, determining hierarchy criteria for a hierarchal query from the file column data, building the hierarchical query and building a regular expression query ("regex query") based on the structure of data records in the changed file (805).

Processing the vertically split attribute data files 804 may further include filtering the vertically split data file (e.g., an unchanged file or a changed file prepared at 805) to determine which data records satisfy one or more of the alternate groups of attribute conditions in the query (806), and for each group of attribute conditions in the query, identifying "passing" keys associated with the data records that satisfy the group attribute conditions and also "rejected" keys associated with the data records that do not satisfy the group attribute conditions (807).

In method 800, processing the vertically split attribute data files 804 may further include identifying the passing keys for which the initial group counts (determined at 803) have been reached (808).

After determining which data records in the vertically split data files satisfy the attribute conditions in the user-defined query 804, method 800 may include using the passing keys for which the initial group counts have been reached to filter the transaction data file (809).

Method 800 may further include using the filtered transaction data file for data analytics, and based on the results of the data analytics modifying marketing campaigns, modifying assortment, merchandising or distribution of the products, and modifying operations in designing, making or distributing the products (810).

Like method 800, method 900 may be used for filtering a product transaction data file. Method 900 may involve receiving, by a computer, a query including one or more alternate groups of attribute conditions for filtering the product transaction data file, the attribute conditions being applicable to product attribute data records split or present across a set of vertically split attribute data files (910). Method 900 may further involve determining which of the product attribute data records present across the set of vertically split attribute data files satisfy at least one group of attribute conditions in the query (920), identifying keys associated with the product attribute data records that satisfy at least one group of attribute conditions in the query (930) and using the identified keys to filter product data records in the transaction data file (940).

Determining which of the product attribute data records present across the set of vertically split attribute data files satisfy at least one group of attribute conditions in the query may include initializing group counts of the attribute conditions in the one or more groups of attribute conditions in the query.

In method 900, determining which of the product attribute data records split or present across the set of vertically split attribute data files satisfy at least one group of attribute conditions in the query may include processing the set of vertically split attribute data files one file at a time, and when a product attribute data record in a current file satisfies a number of attribute conditions in a group of attribute conditions in the query, increasing an effective group count for the key associated with the product attribute data record in the current file by a count equal to the number of attribute conditions satisfied.

Identifying keys associated with the product attribute data records that satisfy at least one group of attribute conditions in the query may include confirming that effective group count ascribed to an identified key, after processing all of the set of vertically split attribute data files, equals an initial group count of the attribute conditions in at least one group of attribute conditions in the query.

Further, in method 900, determining which of the product attribute data records split or present across the set of vertically split attribute data files satisfy at least one group of attribute conditions in the query includes filtering the current file using the at least one group of attribute conditions. Filtering the current file using the at least one group of attribute conditions may include determining attribute criteria from file column data, determining hierarchy criteria from file column data, building a hierarchial query and building a regular expression query to filter the current file.

The various systems and techniques described herein may be implemented in digital electronic circuitry, or in computer hardware, firmware, or in combinations of them. The various techniques may implemented as a computer program product, i.e., a computer program tangibly embodied in a machine readable storage device, for execution by, or to control the operation of, data processing apparatus, e.g., a programmable processor, a computer, or multiple computers.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method comprising:
   hosting a filter engine on a computer;
   coupling the filter engine to a database;
   in a data analytics computing system environment storing master data files for respective data dimensions in the database and storing a transaction data file in the database, the transaction data file including transaction data records, the transaction data records comprising respective keys for one or more of the data dimensions and data for transaction-related attributes associated with the keys, receiving, by the filter engine, a query including a plurality of groups of attribute conditions for filtering the transaction data file, the attribute conditions identifying product attribute data records in the master data files, the master data files comprising respective product attribute data records existing across a set of attribute data files, each product attribute data record including a key and a set of attribute values for a corresponding set of attributes associated with the key, and each attribute data file including, for each product attribute data record, the key and a subset of the set of attributes associated with the key in the product attribute data record;
   determining non-zero initial group counts of the attribute conditions in the groups of attribute conditions in the query, the non-zero initial group counts indicating how many attribute conditions are in respective of the groups of attribute conditions;
   determining, by the filter engine, which of the product attribute data records existing across the set of attribute data files satisfy at least one group of attribute conditions in the query, the determining including, when a product attribute data record satisfies a number of attribute conditions in a group of attribute conditions in the query, increasing an effective group count for the key specifying the product attribute data record by a count equal to the number of attribute conditions satisfied;
   identifying keys specifying the product attribute data records that satisfy at least one group of attribute conditions in the query, the identifying including confirming that the effective group count ascribed to an identified key, after processing all of the set of attribute data files, equals the non-zero initial group count of the attribute conditions in at least one group of attribute conditions in the query;
   generating filtered transaction data comprising only the transaction data records of the transaction data file that include the identified keys; and
   outputting the filtered transaction data for data analytics;
   wherein the filter engine is configured to filter data in the transaction data file based on attribute values in one or more of the master data files that are not part of the transaction data file.

2. The method of claim 1, wherein determining which of the product attribute data records existing across the set of attribute data files satisfy at least one group of attribute conditions in the query includes processing the set of attribute data files one file at a time.

3. The method of claim 1, further comprising filtering the transaction data file using the groups of attribute conditions by determining attribute criteria from column data of product data and building a regular expression query to filter the product data.

4. The method of claim 1, further comprising, mapping attribute field names used in the query to equivalent attribute field names used in the sets of attribute data files and/or transaction data file.

5. The method of claim 1, wherein the groups of attribute conditions in the query comprise at least one group including multiple attribute conditions.

6. The method of claim 1, wherein the groups of attribute conditions in the query comprise at least one group including attribute conditions associated with attribute values stored in different attribute data files of the set of attribute data files.

7. The method of claim 6, wherein the at least one group including attribute conditions associated with attribute values stored in the different attribute data files of the set of attribute data files comprises at least a first attribute condition and a second attribute condition, wherein the first attribute condition is associated with a first attribute and the second attribute condition is associated with a second attribute, wherein values of the first attribute are stored in a first attribute data file of the set of attribute data files and are not stored in a second attribute data file of the set of attribute data files, and wherein values of the second attribute are stored in the second attribute data file and are not stored in the first attribute data file.

8. The method of claim 1, wherein processing an attribute data file of the set of attribute data files comprises:

preparing the attribute data file for filtering, wherein the preparing comprises determining attribute criteria from file column data, determining hierarchy criteria from the file column data, building a hierarchy query, and building a regular expression query based on a structure of the product attribute data records.

9. A system for preparing a database for data analytics, the system comprising:

a memory; and a semiconductor-based processor, the processor configured to execute instructions that are stored in the memory to:

host a filter engine on a computer;

couple the filter engine to a database;

store respective master data files for a plurality of data dimensions in the database;

store a transaction data file, the transaction data file including transaction data records, each transaction data record including respective keys for one or more of the data dimensions and data for transaction-related attributes associated with the keys;

receive, by the filter engine, a query including a plurality of groups of attribute conditions for identifying product attribute data records in the master data files, each master data file including product attribute data records existing across a set of attribute data files, each product attribute data record including a key and a set of attribute values for a corresponding set of attributes associated with the key, and each attribute data file including, for each product attribute data record, the key and a subset of the set of attributes associated with the key in the product attribute data record;

determine, by the filter engine, non-zero initial group counts of the attribute conditions in the groups of attribute conditions in the query, the non-zero initial group counts indicating how many attribute conditions are in respective of the groups of attribute conditions;

determine, by the filter engine, which of the product attribute data records satisfy at least one group of attribute conditions in the query, wherein the determining comprises processing the attribute data files one file at a time, and when a product attribute data record satisfies a number of attribute conditions in a group of attribute conditions in the query, increasing an effective group count for the key specifying the product attribute data record by a count equal to the number of attribute conditions satisfied, wherein at least one of the attribute conditions specifies an attribute not appearing in the transaction data file;

identify, by the filter engine, keys specifying the product attribute data records that satisfy at least one group of attribute conditions in the query, wherein the identifying comprises confirming that the effective group count ascribed to an identified key, after processing all of the set of attribute data files, equals the non-zero initial group count of the attribute conditions in at least one group of attribute conditions in the query;

generate, by the filter engine, filtered transaction data comprising only the transaction data records of the transaction data file that include the identified keys; and output the filtered transaction data for data analytics;

wherein the filter engine is configured to filter data in the transaction data file based on attribute values in one or more of the master data files that are not part of the transaction data file.

10. The system of claim 9, wherein the processor is further configured to filter the transaction data file using the groups of attribute conditions by determining attribute criteria from column data of product data and building a regular expression query to filter the product data.

11. The system of claim 9 configured to map attribute field names used in the query to equivalent attribute field names used in the sets of attribute data files and/or the transaction data file.

12. A non-transitory computer readable storage medium having instructions stored thereon, including instructions which, when executed by a microprocessor, cause a computer system to:

host a filter engine on a computer;

couple the filter engine to a database;

store multiple attribute and multi-dimensional product data, the multi-dimensional product data including respective separate master data files for a plurality of data dimensions including a product dimension, the master data file for the product dimension including product attribute data records existing across a set of attribute data files, the product attribute data records including a key and a set of attribute values for a corresponding set of attributes or column headings associated with the key, and the attribute data files including the key and a subset of the set of attributes or column headings associated with the key in the product attribute data record;

store a transaction data file in a file system, the transaction data file including transaction data records, the respective transaction data records including a key for the product dimension and data for transaction-related attributes associated with the key;

receive, by the filter engine, a query including a plurality of groups of attribute conditions for identifying data in one or more of the master data files, the attribute conditions being applicable to product attribute data records existing across the set of attribute data files;

initialize group counts of the attribute conditions in the groups of attribute conditions in the query;

with the filter engine, determine which of the product attribute data records existing across the set of attribute data files satisfy at least one group of attribute conditions in the query by processing the set of attribute data files one file at a time, and when a product attribute data record satisfies a number of attribute conditions in the group of attribute conditions in the query, increase an effective group count for the key specifying the product attribute data record by a count equal to the number of attribute conditions satisfied;

identify keys specifying the product attribute data records that satisfy at least one group of attribute conditions in the query by confirming that effective group count ascribed to an identified key, after processing all of the set of attribute data files, equals a non-zero initial group count of the attribute conditions in at least one group of attribute conditions in the query;

generate filtered transaction data comprising only the transaction data records of the transaction data file that include the identified keys; and output the filtered transaction data for data analytics;

wherein the filter engine is configured to filter the transaction data file based on attribute values in one or more of the master data files that are not part of the transaction data file.

13. The non-transitory computer readable storage medium of claim 12, wherein the instructions stored thereon include instructions which when executed cause the computer system to filter product data using at least one group of attribute conditions in the query by determining attribute criteria from column data of the product data, and building a regular expression query to filter the product data.

\* \* \* \* \*